United States Patent
McKean

[15] 3,701,355
[45] Oct. 31, 1972

[54] MOBILE CONTAINER DECONTAMINATOR AND RECYCLE METAL RECLAIMER

[72] Inventor: Jack H. McKean, Kansas City, Mo.
[73] Assignee: Baychem Corporation, Kansas City, Mo.
[22] Filed: Nov. 24, 1971
[21] Appl. No.: 201,940

[52] U.S. Cl. ..................134/19, 29/403, 75/44 S, 134/2, 134/25 R
[51] Int. Cl. ..................B08b 7/04, C23g 5/00
[58] Field of Search .134/2, 19, 25 R; 29/403, 200 D, 29/DIG. 7; 75/44 S; 110/18 R; 263/26

[56] References Cited

UNITED STATES PATENTS

| | | | |
|---|---|---|---|
| 3,497,190 | 2/1970 | Moore | 263/26 |
| 3,346,417 | 10/1967 | Ehrlich | 134/19 X |
| 2,977,255 | 3/1961 | Lowry | 134/25 R X |
| 3,031,745 | 5/1962 | Dzialo | 29/403 |

OTHER PUBLICATIONS

" Safe Use of Agricultural and Household Pesticides", U.S. Dept. of Agriculture Handbook No. 321, p. 2, 3 (Jan. 1967).

Primary Examiner—Joseph Scovronek
Attorney—Jack Hensel

[57] ABSTRACT

A method for recycling, as high grade steel scrap, spent metal pesticide containers by shredding the containers into reduced nugget-sized pieces followed by incinerating at a temperature sufficient to burn off all organic residual matter in the can using as combustion air for incineration the pesticide contaminated exhaust air generated by the shredder. A further step includes the removal by after-burning and scrubbing of any residual pesticide entrained in the incinerator off-gases.

6 Claims, 1 Drawing Figure

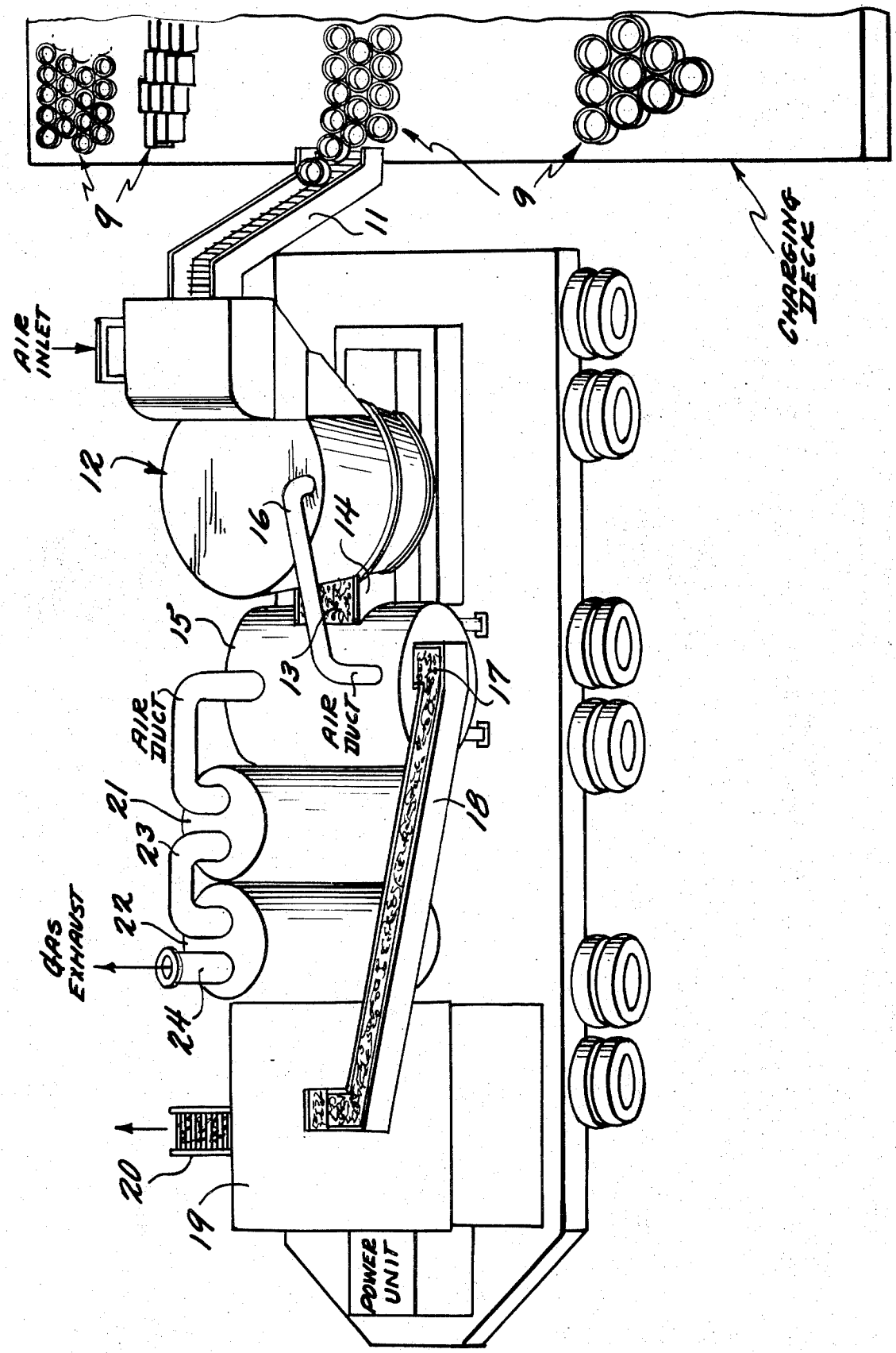

MOBILE CONTAINER DECONTAMINATOR AND RECYCLE METAL RECLAIMER

This invention relates to improved apparatus and methods for decontaminating metal containers used to transport chemicals especially the so-called toxic chemicals such as certain pesticides and other toxic substances.

The invention also relates to an improved apparatus and methods for reclaiming used metal containers and decontaminated metal containers in the form of high grade metal feed stock for recycle to the steel mills for refabrication into useful products.

Heretofore containers in which chemicals have been transported upon being spent have been discarded at or near the spot where emptied creating a potential hazard of contamination to persons coming in contact therewith or with the environment. Not only does this potential hazard exist but such litter creates an unsightly appearance to an otherwise orderly landscape.

Elaborate schemes for decontaminating containers especially those containing toxic residues have been devised such as steam cleaning, rinsing with water or special solvents, rotating the open containers over burners, crushing the containers and burying them. Due to the diversity of the toxic residues no one system or combination thereof has proved completely satisfactory. In all of these schemes there is the hazard that operating personnel may come in contact with any toxic residue from the cleaning, rinsing or crushing of the containers. Usually these procedures involve one or more of these steps constituting a multiplicity of hazards. My invention reduces these potential hazards to the operating personnel by minimizing the handling of the containers and requires the operator merely to load the containers onto conveyors for automatic handling and subsequent manipulation. There is also the ever present possibility that not all of the toxic residues have been removed. And furthermore, the ultimate disposition of a reclaimed drum may not be known and to what use it may be put.

In addition the toxic residues which may be recovered by steam cleaning, solvent extraction, chemical treatment and the like present a disposal problem. Any toxic residues allowed to contact the ground from draining discarded containers are potential contaminants to the environment as are also the discarded steam condensates, solvents used for extraction, etc.

The disposal of the containers as refuse represent a valuable source of metal removed from our national resources. The United States Congress has recently placed emphasis on recycling and reuse rather than disposal in the national solid waste management research program. This invention serves that goal.

Proposed legislation by several states suggest placing the responsibility for pesticide container disposal on the manufacturer rather than at present on the consumer. It is proposed that a refund to the consumer be provided, payable by the manufacturer, who would then have the responsibility of reclaiming the emptied containers. This scheme does not solve the problem of container disposal since in most cases it is not economical or practical to refurbish or reuse the containers. Therefore, the manufacturer is still faced with the problem of safe, economical metal container disposal.

From a consideration of these observations in mind the principal object of my invention is to provide an improved apparatus and method for decontaminating spent metal containers having toxic residues therein.

Another object of my invention is to provide an improved apparatus and process for recovering for recycle, in the economic flow, metal from spent metal containers.

A further object of my invention is to improve the quality of the environment by providing means to collect discarded, used, metal containers and process them into a valuable source of recycle metal.

A further object of my invention is to prevent the contamination of the environment from toxic residues contained in discarded containers.

A still further object of my invention is to provide mobile equipment in order to carry out the above objects.

These objects together with the following description will disclose still further objects deemed to be my invention as well as any variations or modifications thereof and which come within the spirit of said invention taken together with the scope of the claims thereto.

The FIGURE is a schematic diagram of the sequential steps involved in practicing a preferred embodiment of this invention.

The containers 9 to be reclaimed are placed on the charging deck or platform adjacent to a conveyor 11 for transporting said containers to a shredder 12. A preferred shredder is of the cutting type having rotary breaker bars which tear pieces of the container and drop them by gravity into a series of grinding wheels contained in a barrel-shaped shell. As the tear pieces feed by gravity to successive lower rotating grinding wheels the distance between progressively lower wheels and the shell becomes progressively less thus causing the sheared material to become smaller in size finally attaining the size of an inch or so in diameter referred to herein as nugget-sized pieces. To assist in this cutting and shearing action, bars are fixed inside the shell projecting into the path of the descending tear pieces. Commercial shredders are available on the market operating on this principle. However, other types of size-reduction equipment such as shears, cutters and clippers may also be employed.

As the shredded pieces or nuggets 13 of the container are discharged from the size-reduction equipment they are moved by conveyor 14 to an incinerator 15 which performs several functions. Primarily the incinerator operating in the range of 1,000° F to 1,300° F is to volatilize and combust the residual contents of the container present on the nuggets. I have found that since the shredder generates a rather large volume of air discharge during the shredder operation and this discharge is contaminated with the residual chemicals in the container it is advisable to conduct by duct 16 this discharge from the shredder as air supply for the incinerator together with fuel for the combustion mixture. In this way no contaminant chemicals are discharged into the atmosphere from the shredder but such chemicals as are caught up in the air discharge will be combusted in the incinerator. The incinerator also combusts the labels on the containers as well as any organic liners used to coat the inside of the containers.

The resulting shredded-incinerated nuggets 17 emerge from the incinerator free from organic matter and are of high quality steel feed stock for recycle to the steel mills.

The nuggets 17 are conveyed by conveyor 18 to the storage bin 19 and therefrom by conveyor 20 to a truck, train or other suitable means for transport to steel mills.

In order to prevent escape of unburned residue passing from the incinerator, an after burner 21 is provided as noted in the FIGURE. This burner operating at about 1,000° C serves as a back-up unit to ensure as complete combustion as possible to any residual organic matter which might pass through the incinerator incompletely combusted.

As a further precaution I have provided a gas scrubber 22 which may be of the conventional impingement baffle, venturi-impingement or venturi, cyclonic or packed tower type. The scrubber is connected by duct 23 to the discharge of the after burner thus providing means for scrubbing all air passing through the shredder, incinerator and after burner. An air discharge duct 24 is provided on scrubber 22 to exhaust the combustion gases.

Although I have depicted in the FIGURE a mobile unit capable of being transported from one site to another such as a container area provided where the spent containers can be collected in a geographical location, it is to be understood that such equipment may be permanently located. Such mobile unit may be the flat bed of a truck trailer or train car. The mobile unit can be equipped with a power generating source to operate the required motors for conveyors, shredder, blowers and other electrical accessories or the power may be provided at each container collection or processing point.

In an experiment a series of emptied 5-gallon cans, 30 and 50 gallon drums which had contained a pesticide formulation of DI-SYSTON (0,0-diethyl-S-(2-(ethythio) ethyl) phosphorodithioate) liquid concentrate containing 6-pounds active per gallon were charged to the shredder and were incinerated. Samples of the drum were taken and analyzed before and after shredding and after incineration with a residence times of 4 minutes in the incinerator operating at about 1,200° F. The amounts of DI-SYSTON residues found at these various stages are expressed in parts per million in Table 1.

TABLE 1

| Sample | DI-SYSTON found |
|---|---|
| Charge to Shredder | Ca. 10,000 |
| Discharge from Shredder | 240 |
| After Incineration 4 Minutes | Less Than 1.0 |

It is surprising that the shredding operation greatly reduces the residual pesticide present on the shredded drum pieces. It is postulated that this effect is due to the volume of air passing through the shredder (5,000 cubic feet of air per minute) and the heat generated during the shredding stage (about 400° F).

It is stated in RESIDUE REVIEWS 29, 96 (1969) that "With a very few exceptions, it seems safe to assume that temperature at or near 1,000° C. will be sufficient to degrade 99 percent or more of most commercial pesticidal formulations."

Pesticide formulations tested and reported on in RESIDUE REVIEWS 29, 95 (1969) as thermally degraded at or below 1,000° C. include the following recognized commercially available products:

| | | |
|---|---|---|
| 2,4-D | Atrazine | Malathion |
| 2,4,5-T | Bromacil | DSMA |
| Dicamba | Paraquat | Nemagon |
| Dalapon | Sevin | PMA |
| Torclon | Vernam | Treflan |
| DDT | DNBP | Zineb |
| Dieldrin | Diruran | |

Based upon these findings my after burner will completely combust the commercially available pesticides. If a new product, pesticide or other residue, should require temperatures in excess of 1,000° C. for complete combustion provision can be made by operating the after burner at such elevated required temperatures.

It is to be understood that numerous modifications or variations in the method and apparatus hereinabove described are possible and the method may be used in connection with containers other than those having contained pesticides, or toxic residues including non-toxic residues. It is intended to include the recovery for recycle of spent metal containers regardless of the type of chemicals contained therein. It is further intended to include herein not only the form of the invention described in the foregoing specifications and illustrated in the drawing but also any and all variations, modifications or adaptations thereof as may come within the spirit of said invention and within the scope of the following claims.

What I claim is:

1. A method of converting spent metal pesticide containers having combustible contaminants therein into recycle high grade scrap metal comprising:
    a. shredding such containers into nugget-sized pieces thereby substantially reducing said contaminants on said pieces,
    b. incinerating such pieces,
    c. using, from the shredder exhaust, air containing contaminants therein as combustion air for the incinerator and
    d. further purifying said combustion gases from the incinerator.

2. A method according to claim 1 wherein the combustion gases from the incinerator are purified by passing them through an after burner at a temperature higher than the incinerating temperature.

3. A method according to claim 2 wherein the exhaust gases from the after burner are further purified by subjecting such gases to a scrubber to remove any entrained residual contaminants therein.

4. A method according to claim 1 wherein incineration temperature is sufficiently high to combust the contaminants.

5. A method according to claim 4 wherein the incinerating temperature is between about 1,000° F to 1,300° F.

6. A method according to claim 2 wherein the after burner operates at a temperature substantially about 1,000° C.

* * * * *